Figure 6:
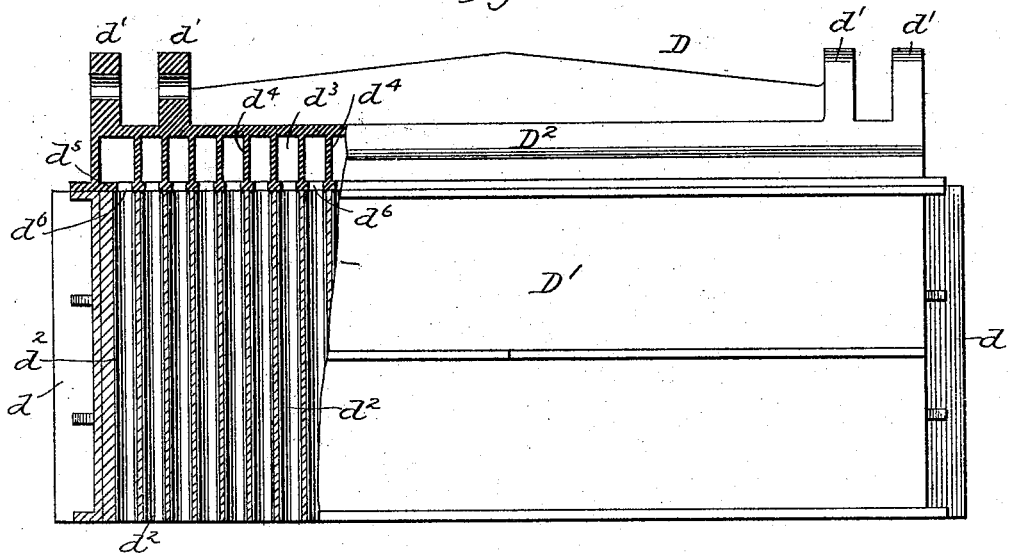

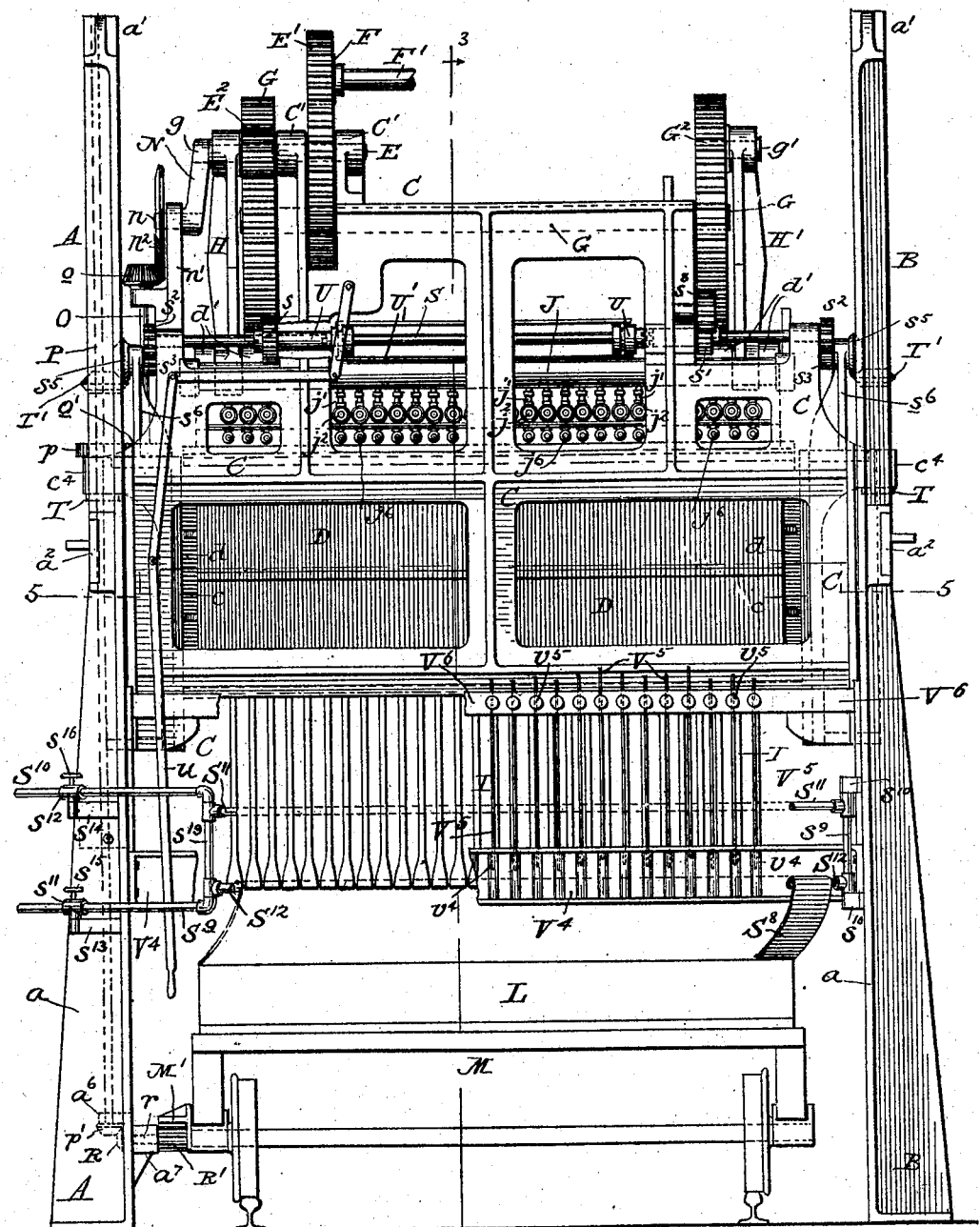

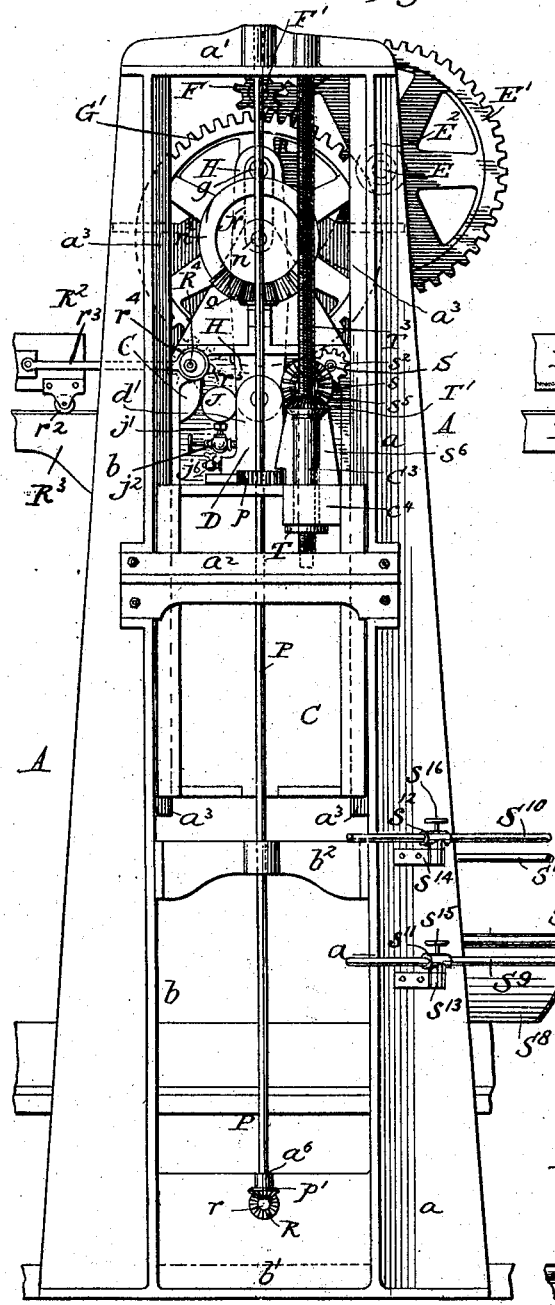
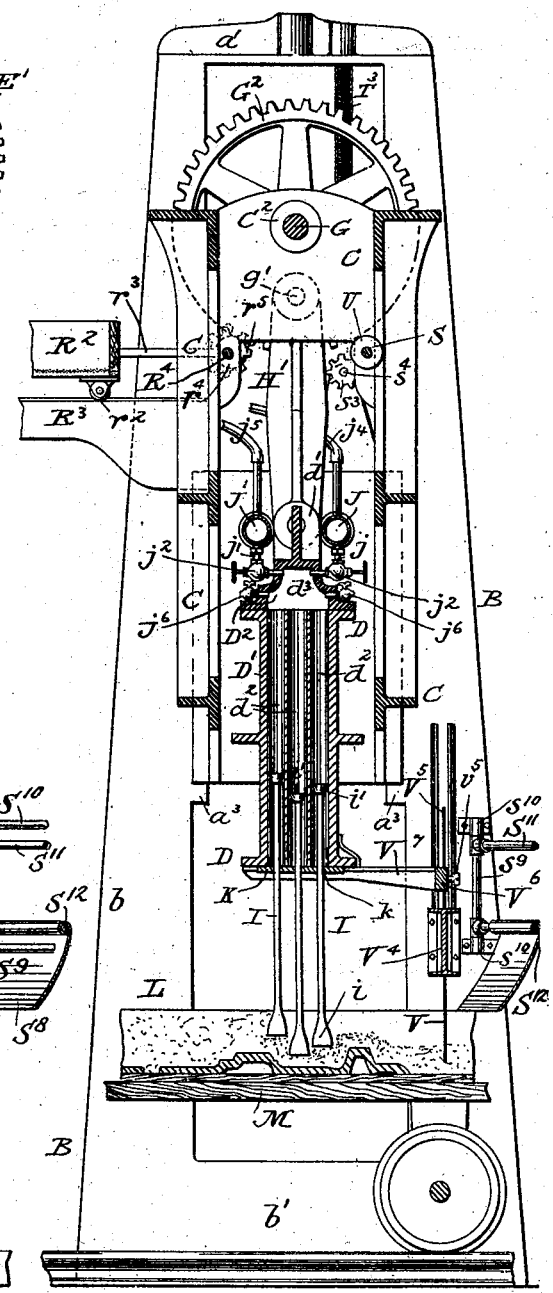

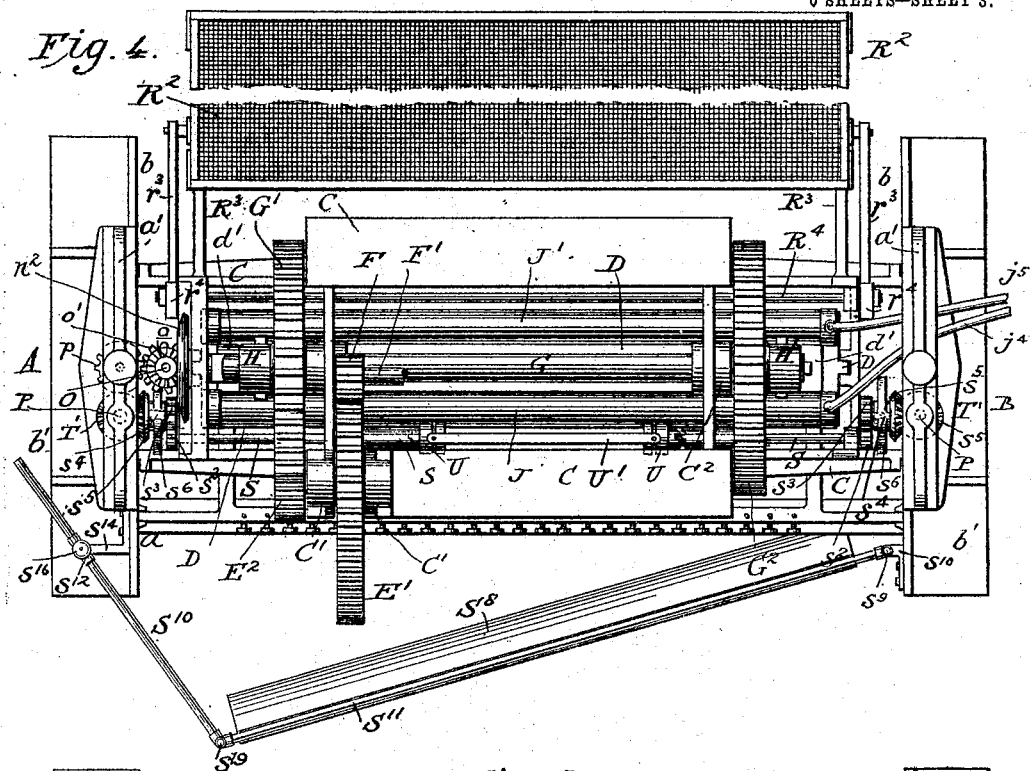

No. 806,179. PATENTED DEC. 5, 1905.
W. J. PATCHELL.
MOLDING MACHINE.
APPLICATION FILED JUNE 6, 1904.

6 SHEETS—SHEET 4.

Witnesses
George T. Bean.
J. D. Klingel.

Inventor
William J. Patchell,
by W. T. Henderson,
Attorney

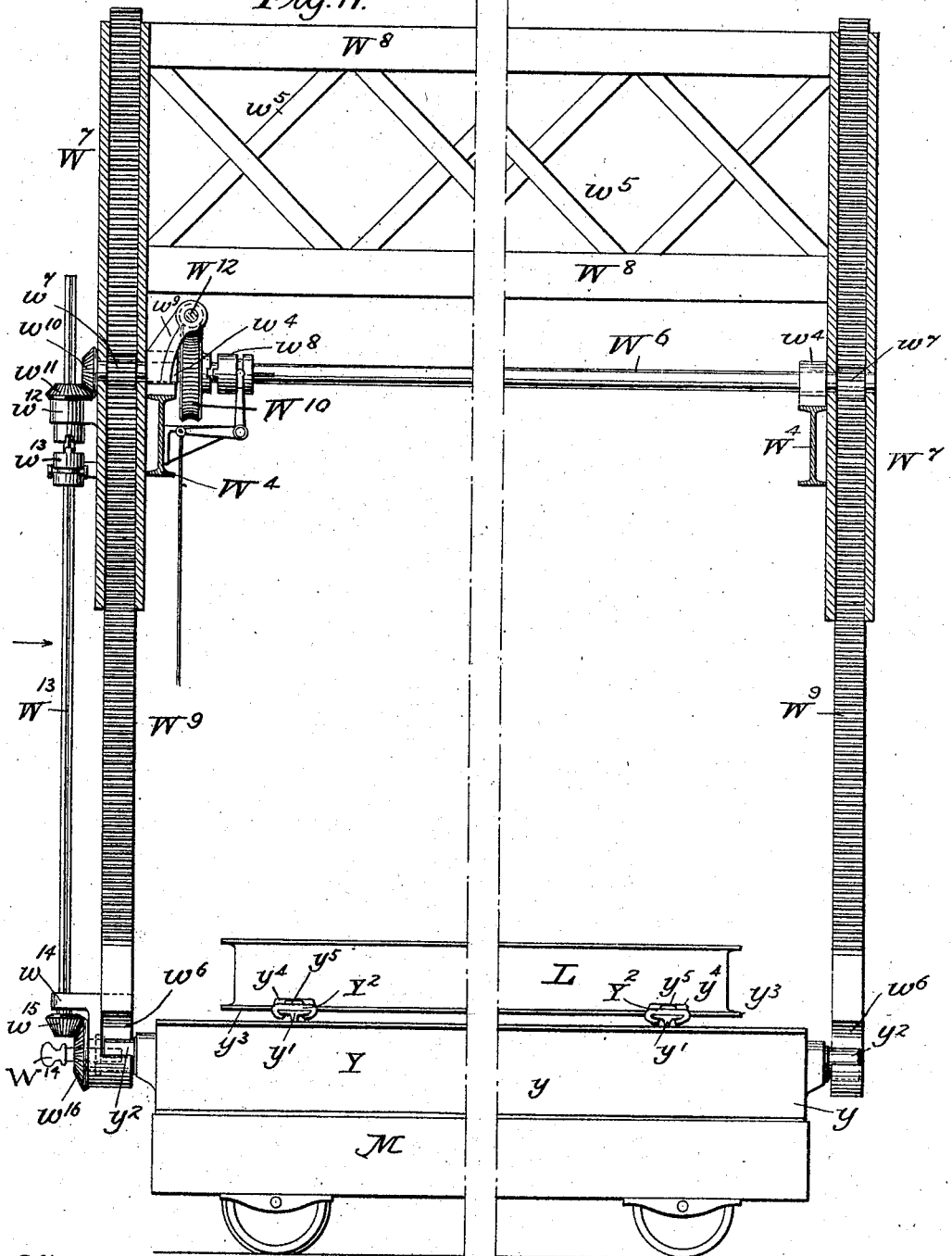

No. 806,179. PATENTED DEC. 5, 1905.
W. J. PATCHELL.
MOLDING MACHINE.
APPLICATION FILED JUNE 6, 1904.
6 SHEETS—SHEET 6.
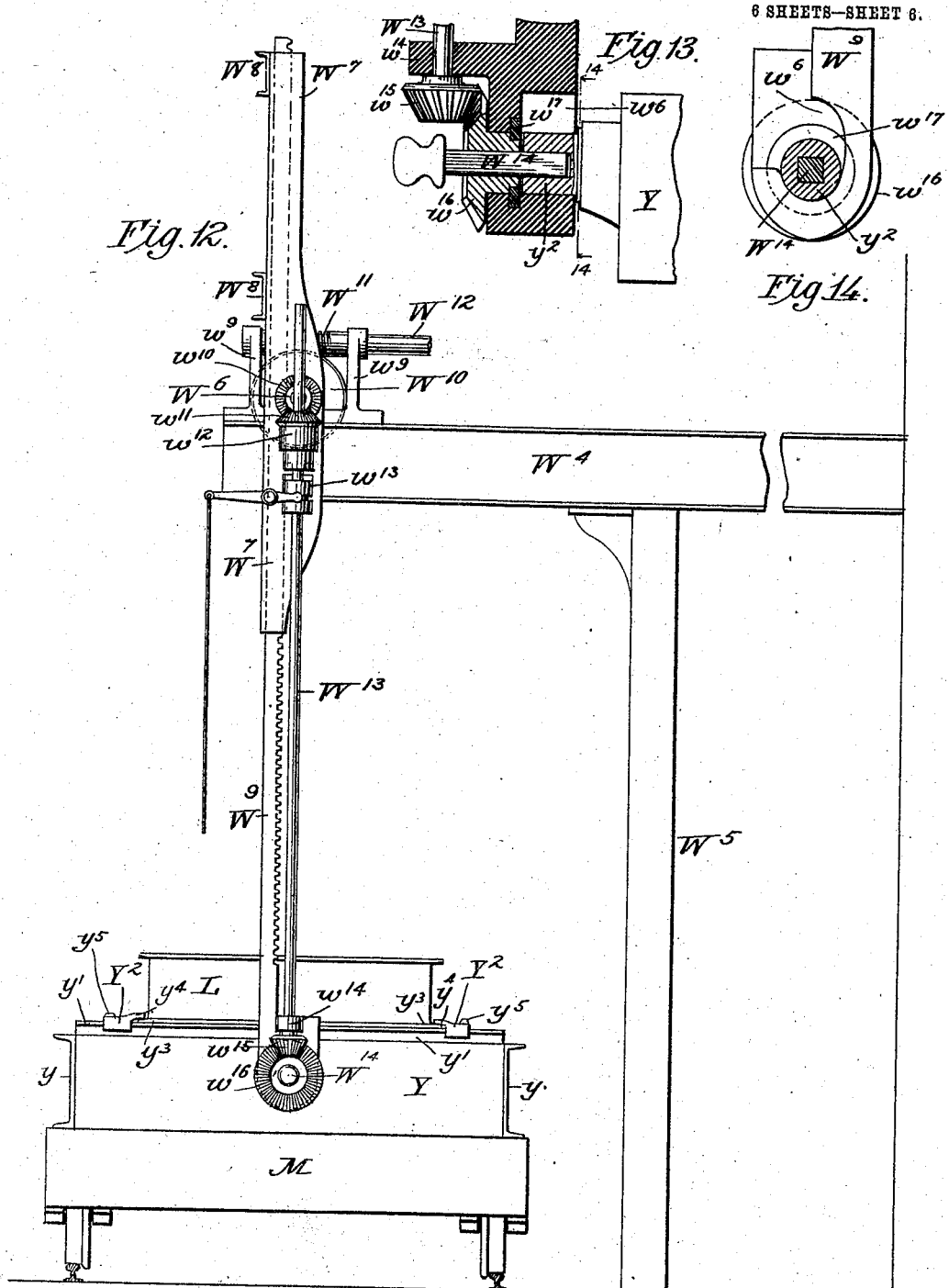
Witnesses
George T. Bean.
J. D. Klingl
Inventor
William J. Patchell
by
Attorney

UNITED STATES PATENT OFFICE.

WILLIAM J. PATCHELL, OF ST. LOUIS, MISSOURI.

MOLDING-MACHINE.

No. 806,179.   Specification of Letters Patent.   Patented Dec. 5, 1905.

Application filed June 6, 1904. Serial No. 211,392.

*To all whom it may concern:*

Be it known that I, WILLIAM J. PATCHELL, a citizen of the United States, residing at St. Louis, in the State of Missouri, have invented certain new and useful Improvements in Molding-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a sand-molding machine or mechanism for firmly packing the sand placed in a molder's flask over a pattern inserted therein and around the edges of the flask preparatory to forming a mold in which to make a casting.

One of the objects of my invention is to produce a machine containing a vertically-reciprocating ramming-head carrying a series of vertically-placed tubes or cylindrical openings in each of which a small ram provided with a piston-head is adapted to be forced outwardly by means of fluid-pressure. Each ram has an enlarged outer end, the working face of which is preferably square and of such dimensions that when in operative position the series of rams will present a substantially unbroken ramming-surface.

Another object of my invention is to arrange the cylinders in the ramming-head in rows crosswise thereof and connect the cylinders of each row with a chamber into which air under pressure may be admitted at will. The arrangement is such that two air-pipes conveying air at different pressures are each independently connected by small valved pipes to the several chambers, by which means the chambers and the cylinders communicating therewith may be charged with air at either a high or low pressure or be entirely cut off.

A further object of my invention relates to means for raising and lowering the rectangular frame which carries all the working parts, including the ramming-head, so that the rams may be brought to suitable working position with relation to the flask irrespective of the fact that a high or low flask is to be used, also to means for throwing certain rams out of action when a narrow flask is placed beneath the machine, and to means for automatically moving the truck on which the flask is carried.

Other features of the invention not enumerated herein will be referred to in the description following, and specifically pointed out in the claims.

Figure 7:
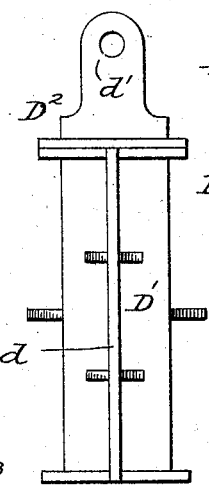
Figure 9:
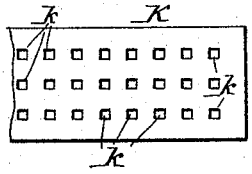
Figure 10:
Figure 8:
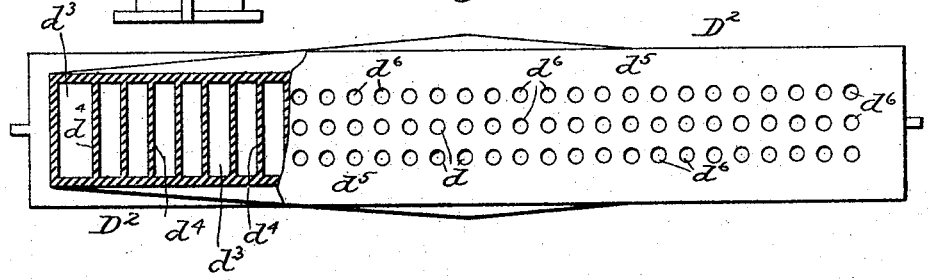

In the annexed drawings, Figure 1 is a view in side elevation of my invention. Fig. 2 is an end view; Fig. 3, a vertical cross-sectional view on the line 3 3 of Fig. 1. Fig. 4 is a plan view; Fig. 5, a view in horizontal section on the line 5 5 of Fig. 1. Fig. 6 is a side view of the ramming-head detached and partly broken away. Fig. 7 is an end view of the same. Fig. 8 is a bottom view of the cap-piece, partly in section. Figs. 9 and 10 are views of details. Fig. 11 represents an elevation (broken away in the middle) of a mechanism for reversing or "turning over" the flask after being tamped for removing the pattern. Fig. 12 is an elevation of the same mechanism viewed in the direction indicated by the arrow in Fig. 11. Fig. 13 is an enlarged sectional detail view of the bearing on the flask-supporting frame and one of the hangers; and Fig. 14 is a section view on the line 14 14, Fig. 13.

Referring to Figs. 1, 2, and 3, two vertically-placed uprights or supports A and B are shown, one at each end of the machine. Each support consists in part of a front leg or column $a$ and a similar rear one, $b$, the two columns being united by a cap $a'$ and a base $b'$. Each upright or support is preferably cast in one piece; but if found more convenient or desirable it may be built up of several pieces riveted or bolted together. To the legs or columns $a$ $b$ of the support A are bolted cross-pieces $a^2$ and $b^2$. The opposite support B has its columns connected by a single cross-piece $a^2$.

Between the end supports A B and extending from one to the other is a hollow rectangular box-like structure or frame C, grooved externally at each corner and adapted to engage with and slide upon rails or plates $a^3$, projecting inwardly from the columns $a$ $a$ and $b$ $b$. Within the box or frame C is placed a ramming-head D, fins $d$ on the ends thereof engaging grooved guides or ways $c$ within the frame C at its ends. (See Fig. 5.) At the top of the frame C and at one side thereof project bearings C' C', in which is journaled a shaft E, carrying a gear-wheel E', driven by a pinion F on a shaft F', the latter receiving power from any suitable mechanism, preferably an electric motor. The shaft E also carries a pinion $E^2$ for rotating a gear-wheel G', mounted on one end of a horizontal shaft G, supported in bearings $C^2$, fixed to the box or frame C. The shaft G extends lengthwise of the machine and carries a second gear-wheel $G^2$, similar to $G'$. Crank-pins $g$ $g'$ are attached to the respective gear-wheels $G'$ $G^2$, on which pins are journaled connecting-links H H', their lower ends being pivoted to ears $d'$ $d'$ on the upper side of the ramming-head D. It will be readily understood from the above that the operation of the motor will by the means described cause a more or less rapid reciprocation in a vertical direction of the ramming-head.

The ramming-head D consists, primarily, of a rectangular body D', having a length preferably greater than its width, through which are formed a series of vertically-disposed cylindrical openings $d^2$. These cylindrical openings or cylinders $d^2$ may be made by boring through a solid block of metal or through a series of narrow blocks assembled in the body D' or preferably by a number of cylindrical tubes placed within the box-like body and fixed therein. As shown in Fig. 5, the cylinders $d^2$ are arranged in symmetrical rows lengthwise and crosswise of the body D'. In the instance illustrated in the drawings the longitudinal rows contain twenty-nine cylinders, while in the cross-rows there are but three.

Secured to the top of the body D' by bolts or other fastening devices is a cap $D^2$, in which are formed chambers $d^3$, separated from each other by cross-partitions $d^4$. A plate $d^5$ forms the bottom of the cap $D^2$, through which plate holes $d^6$ are made, so that when the cap $D^2$ is secured in place on the body D' the holes will register with the cylinders $d^2$. From this it will be observed that the cylinders $d^2$ of each cross-row open into the same chamber $d^3$. Extending upwardly from each end of the cap $D^2$ are the ears $d'$, to which the connecting-links H H' are journaled and by means of which the ramming-head is operated.

Within each cylinder $d^2$ a ram I is adapted to reciprocate, each ram being preferably square in cross-section with an enlarged rectangular lower end $i$ and a circular head or piston $i'$, fitted air-tight within its cylinder. The rams I are forced downwardly and held normally in this position by means of compressed air.

Extending longitudinally of the ramming-head D and upon opposite sides of the cap $D^2$ (see Fig. 3) are two compressed-air cylinders or pipes J J', one pipe carrying air at about eighty pounds' pressure, while the other one, J', is charged with air at a pressure of about twenty pounds. These pipes J J' receive compressed air through flexible tubes $j^4$ and $j^5$ from any well-known form of air compressor or compressors. Each chamber $d^3$ in the cap $D^2$ is connected with both compressed-air pipes J J' by means of small pipes $j$ $j'$, respectively, each small pipe being supplied with a valve $j^2$ for admitting compressed air into the chamber $d^3$ and from thence to the three cylinders $d^2$ in communication therewith. A petcock or exhaust-valve $j^6$ opens out from each chamber, by means of which the compressed air therein may be exhausted at any time. A fixed plate K, placed beneath the body D', is perforated with square holes $k$, through which the rams pass and are guided thereby.

L represents a molder's flask in which a pattern of the article to be cast is placed and covered with sand to be tamped by the rams I. The flask L rests on a truck M, adapted to be moved crosswise of the machine beneath the rams I by means of suitable gearing now to be described.

The crank-pin $g$, which projects beyond the connecting-link H, carries an arm N, projecting inwardly toward the shaft G, the said arm being provided with a short shaft $n$, the axis of which and of the shaft G are coincident. To the shaft $n$, which turns in a bearing $n'$, is fixed a mutilated bevel gear-wheel $n^2$, meshing with and at the proper time revolving a bevel-pinion $o$, secured to a vertical shaft O, on the lower end of which is placed a small gear-wheel $o'$.

A vertical shaft P extends the length of the upright or support A and carries a gear-wheel $p$, which engages with and is turned by the gear $o'$. The gear $p$ is adapted to slide vertically on the shaft P and also to rotate it. The lower end of the shaft P, which turns in a bearing $a^6$, is provided with a bevel-gear $p'$ in engagement with a similar gear R on a short shaft $r$, carried in a bearing $a^7$ on the upright support A. The inner end of said shaft $r$ has fixed thereon a pinion R' in engagement with a rack M', fixed to the truck M, supported on rails, as shown. Thus with each revolution of the mutilated bevel gear-wheel $n^2$ the pinion $o$ is given one rotation, which through the gearing described turns the pinion R' and moves the truck forward a certain fixed distance.

Assuming that a flask L containing the pattern and sand rests on the truck M and that compressed air at, say, eighty-pounds pressure has been admitted to all the chambers $d^3$, the rams I will each be forced outwardly by a pressure of eighty pounds. The mechanism being now started, the ramming-head will be carried downward and the rams caused to press on and pack the sand within the flask, the compressed air also serving as a cushion in the upward movement or yielding of the rams when pressed against the sand, thus allowing the rams to have a variable stroke, whereby they will accommodate themselves to irregularities of the pattern in the flask. As the ramming-head is raised by the connecting-links H H' the mutilated bevel gear-wheel will engage with the bevel-pinion $o$ and through the gearing heretofore described rotate the pinion R' and cause a forward movement of the truck M for the purpose of bringing a fresh portion of the sand in the flask beneath the rams I, the movement of the truck being completed before the rams make their next stroke. As it has been found desirable to pack the sand harder along the sides of the flask, or at the "parting," than in the center over the pattern chambers at the ends of the cap $D^2$ are filled with the higher air-pressure, while others are opened to the lower pressure. When a flask narrower than the largest size permissible on the machine is to be packed, the rams I which will not be needed are pushed up into their cylinders, the petcocks being first opened to allow the air to escape and then closed. The rams thus elevated will be retained in their position by atmospheric pressure, as the lower ends of the cylinders are open.

To enlarge the scope of the machine so that it may operate on flasks of different heights, the rectangular box-like frame C is supplied with means for raising and lowering it on the end supports A and B. As the ramming-head D and the mechanism by which it is operated and other coacting parts are connected to or supported by the rectangular frame C, this frame may be moved without disturbing the relation of any of said parts. By adjusting the frame and the ramming-head together the rams are brought to the proper position for flasks of various depths without changing the length of stroke of the ramming-head and its rams.

Journaled in bearings on the front of the rectangular frame C is a shaft S, on which are loosely sleeved two pinions $s$ and $s'$, adapted to be actuated, respectively, from gear-wheels $G'$ $G^2$ when brought into operative connection therewith by clutch mechanism such as that hereinafter described. On each end of the shaft S is fixed a pinion $s^2$, each of said pinions engaging with similar pinions $s^3$ on short shafts $s^4$, supported in bearings $s^6$ and carrying each a bevel-pinion $s^5$. At each end of the rectangular frame C is a projecting portion $c^4$, which extends between the columns of the supports A B. Secured to these projecting portions are upstanding bearings $C^3$, in each of which a threaded sleeve or nut T is adapted to rotate. The upper end of each sleeve is provided with a bevel-pinion $T'$ in rotative engagement with the bevel-pinions $s^5$. Passing vertically through each of the threaded sleeves T is a screw-threaded rod $T^3$, fixed to the cap-piece $a'$ and cross-piece $a^2$ of its respective support.

A clutch mechanism comprising the clutches U, feathered to the shaft S and connected by a rod U' and operated by a handle or lever $u$, when shifted in one direction will clutch the sleeve of pinion $s$ to the shaft S and cause the shaft to be turned in one direction by the gear-wheel $G'$ and when shifted in the opposite direction will unclutch pinion $s$ and clutch pinion $s'$, which being in mesh with pinion $s^8$ and that pinion in mesh with gear $G^2$ will cause shaft S to revolve in the opposite direction. The rotation of shaft S will transmit its motion to the threaded sleeves T, which by their rotation on the screw-rods $T^3$ will cause the frame C to be raised or lowered according to the direction in which the shaft S is turned.

For the purpose of sifting sand onto the flask I provide a screen or riddle $R^2$, which is supported by grooved wheels $r^2$, resting upon a track formed by brackets $R^3$, extending out from the main frame C of the machine. This riddle is connected by rods $r^3$ with eccentrics $r^4$, mounted on a shaft $R^4$, journaled in suitable bearings on the frame and provided with pinions $r^5$, which mesh with and derive motion from the gear-wheels $G'$ $G^2$, so that in the rotation of the shaft and its eccentrics the riddle will be reciprocated back and forth and the sand sifted by its screen. The sand passing through the screen will pass down onto the flask, to which it may be conducted by a suitable hopper (not illustrated) or otherwise. The sand will be conducted to the riddle by any suitable conveyer. After the mold has been tamped and finished it should be "vented" for the escape of the gas. For that purpose I support a cross guide-beam $V^4$ from the upright standards A and B, and in which is drilled a number of vertical holes $v^4$ for the passage and guidance of a number of wires or needles $V^5$, which are adjustably supported from above by a cross-bar $V^6$, supported on brackets $V^7$, extending out from the bottom portion of the ramming-head or plunger-frame D. The cross-bar $V^6$ is drilled for the passage of the wires or needles, and the latter are held therein by the set-screws $v^5$ after being adjusted to conform to the irregularities in the pattern. Now as the cross-bar $V^6$ is raised and lowered with the vertical movements of the rammer-head or plunger-frame the wires or needles are raised and lowered and the finished mold perforated, so as to permit the escape of gas.

For the purpose of "striking" off the surplus sand from the flask I provide a scraper $S^8$, which at one end is hinged to a vertical rod $s^9$, supported by brackets $s^{10}$, attached to the upright standard B, and at the other end is jointed to the rods $S^9$ and $S^{10}$, which pass through sleeves $s^{11}$ and $s^{12}$, supported by brackets $s^{13}$ and $s^{14}$, attached to the opposite upright A. By sliding the rods $S^9$ and $S^{10}$ in their sleeves the scraper may be adjusted to the angle desired and held thereto by the locking or set screws $s^{15}$ and $s^{16}$. The rod $S^{10}$ is jointed to a rod $S^{11}$, which at that point will be connected by a vertical rod to the rod $S^{12}$, to which the upper edge of the scraper is attached, the opposite end of such rod, as well as the end of rod $S^{11}$, being connected to the vertical rod $s^9$, as illustrated. The rod $S^{11}$ serves to brace the scraper. By providing for the vertical adjustment of the scraper or "strike" its height may be varied to correspond with the height of flask used and by providing for its angular adjustment can be brought to the position for most effectively striking off the surplus sand according as the degree to which the sand has been tamped may require. If the sand is rammed very hard, as is customary in steel-founding, the angle of the scraper can be made greater than is needed for the ramming of cast-iron, as the greater the angle the less power required to strike off the sand. Another advantage of this adjustment is that the sand thrown off by the strike may be delivered into a hopper at the side of the flask and from thence carried by a conveyer to the storage-tank for use again. Sometimes as a matter of practical convenience the position of the hopper may be changed, and this angular adjustment of the strike permits the proper delivery of the sand to the hopper.

After the sand has been rammed the "drag" is turned over preparatory to applying the "cope," and with that in view I have devised the following mechanism for "rolling over" the drag, the mechanism being placed at the end of the machine from which the carriage carrying the rammed mold emerges: Two parallel beams $W^4$, each supported upon a column $W^5$, support a horizontal shaft $W^6$, journaled in bearings $w^4$. This shaft supports a swinging frame composed of hollow vertical side members $W^7$, connected together by cross-bars $W^8$, braced by plates $w^5$, the ends of the shaft passing through the hollow side members $W^7$, so that the frame will swing. Within these hollow side members fit rack-faced bars $W^9$, which at their lower ends are formed with open-faced boxes $w^6$, and in engagement with the rack-faces are pinions $w^7$, which are secured to the ends of the shaft $W^6$, so that said bars may be raised and lowered by rotation of the shaft. The shaft $W^6$ carries a loosely-mounted worm-wheel $W^{10}$, which may be locked to the shaft by a clutch $w^8$, feathered to the shaft, so as to rotate the shaft. The worm-wheel derives its motion from a worm $W^{11}$, forming a part of a shaft $W^{12}$, supported in bracket-arms $w^9$ and driven by any suitable motor. (Not shown.) One end of the shaft $W^6$ carries a bevel-pinion $w^{10}$, which gears with a bevel-pinion $w^{11}$, supported by a bracket $w^{12}$, carried by the side member $W^7$, and through the pinion $w^{11}$ passes a vertical shaft $W^{13}$, which has feathered to it a clutch $w^{13}$, by which the pinion $w^{11}$ may be clutched to the shaft $W^{13}$ and then cause said shaft to rotate. The lower end of shaft $W^{13}$ passes through a bracket $w^{14}$, carried by the lower end of the rack-bar $W^9$, and is provided with a bevel-pinion $w^{15}$, which meshes with a pinion $w^{16}$, journaled to turn in the box end of the rack $W^9$. This pinion is held in place by a collar $w^{17}$ and is hollow or formed with a central opening, angular in cross-section, to receive a correspondingly-shaped locking-pin $W^{14}$ for a purpose hereinafter mentioned.

Upon the carriage or truck M is set the open frame Y, which consists of channeled iron sides $y$, supporting the I-beams $y'$, whose upper edges project above the top of the frame. The frame Y is provided with end gudgeons or journals $y^2$, and on top of the I-beams $y'$ is placed the flask L, the cheeks of which have flanges $y^3$, as illustrated. The flask is clamped to the I-beams $y'$ by clamps $Y^2$, which are grooved on their under faces, so as to slide on the flanges of the beams, and are formed each with a lip $y^4$ to fit over the flange of the flask and also with a stud or shoulder $y^5$ to be struck by a tool in driving the clamp to and out of clamping position. The gudgeons $y^2$ of the frame Y fit in the open-face boxes $w^6$ of the racks $W^9$, and the frame is locked to the pinion $w^{16}$ by the locking-pin $W^{14}$, which enters an angular opening formed in the gudgeon $y^2$ at that end of the frame.

With the parts arranged as shown in Figs. 10 and 11 of the drawings if the worm-wheel be clutched to the shaft $W^6$ and the vertical shaft $W^{13}$ be clutched to the pinion $w^{11}$ the racks $W^9$ will be elevated and the frame Y lifted, and the shaft $W^{13}$ will be rotated so as to "turn over" the frame and the flask carried by it. The turning of the frame may be stopped by throwing out the clutch $w^{13}$, and by reversing the rotation of the worm the racks and frame Y may be lowered. When the carriage or truck is again to be moved into place to supply sand to the mold and to ram the sand, the swinging frame carrying the racks $W^9$ is swung away from the truck, so that the latter may be moved without interference from the "turning-over" mechanism. The truck may carry the frame Y, with the flask clamped thereto, into position for receiving the sand from the riddle and for ramming the sand, or the flask may be set directly on the truck or carriage without the employment of the frame Y.

While I have shown and described the chambers $d^3$ as communicating with but three cylinders, it is to be understood that a greater or lesser number of cylinders may open into a chamber; also, that the position or arrangement of the chambers may be varied from that shown in order that certain parts of a flask may be packed more or less firmly than at other parts; also, that other means than the screws may be employed for vertically adjusting the frame carrying the ramming-head. It will also be understood that if the truck supporting the flask be stationary and the framework carrying the operating mechanism be made to move back and forth over the flask instead of the flask being moved back and forth under said mechanism the invention described will be the same.

I have illustrated and described the preferred construction and arrangement of the several parts; but changes can be made and essential features of my invention be retained.

I have mentioned compressed-air as the pressure fluid; but it will be understood that any other elastic fluid or agent serving the same purpose will be included within that designation.

Having described my invention and set forth its merits, what I claim is—

1. In a sand-molding machine, an adjustable frame, a ramming-head carrying rams and reciprocable in said frame, power-driven means for adjusting said frame and ramming-head, and means for throwing said power-driven means into and out of operation, substantially as described.

2. In a sand-molding machine, the combination of an adjustable frame, a ramming-head reciprocable in said frame and divided into chambers, cylinders depending from said head and in communication with said chambers, piston-headed rams in the cylinders, means for admitting a pressure fluid to the chambers, power-driven means for adjusting said frame and ramming-head, and means for throwing said power-driven means into and out of operation, substantially as described.

3. In a sand-molding machine, an adjustable frame in combination with a ramming-head adapted to reciprocate vertically within said frame, said ramming-head being provided with a series of cylinders arranged in rows and having a chamber in communication with each row of cylinders, a piston-headed ram in each cylinder, and means for admitting a pressure fluid to the chambers.

4. In a sand-molding machine, an adjustable frame, a reciprocable ramming-head carried by said frame, mechanism on said frame for reciprocating said head, power-driven means for adjusting said frame and ramming-head, and means for throwing said power-driven means into and out of operation, substantially as described.

5. In a sand-molding machine the combination of fixed uprights or supports, a frame adjustably connected thereto, operating mechanism on said frame, a screw on each upright, a rotatable nut on each end of said frame in engagement with said screws, gearing between the operating mechanism and the rotable nuts, and means for engaging and disengaging said gearing.

6. In a sand-molding machine, a ramming-head containing a series of cylinders and chambers, each chamber being in communication with a cylinder, combined with a ram in each cylinder, and means for connecting each chamber with sources of pressure fluid of different pressures.

7. In a sand-molding machine, a ramming-head containing a series of cylinders and chambers, each chamber being in communication with a cylinder, combined with a ram in each cylinder, means for independently connecting each chamber with a source of pressure fluid and a valve for exhausting the pressure fluid from any desired chamber.

8. In a sand-molding machine, a ramming-head carrying a bank of cylinders and vertically adjustable to various heights above a flask-supporting truck, a ram in each cylinder and extending below the same, an elastic cushion to resist the inward movement of the rams, said cushion consisting of an elastic fluid of a predetermined pressure to suit the conditions of the work and resistance to be offered, means for reciprocating the head and bank of cylinders, a flask-carrying truck adapted to move transversely beneath the rams, and means connected with and actuated from the ramming mechanism under the various vertical adjustments of the vertically-adjustable ramming-head for moving the truck as the rams are moved in one direction.

9. In a ramming-head for sand-molding machines, the combination with the head, of a series of cylinders, the head containing a series of chambers, each chamber being arranged to communicate with one of the cylinders, a ram in each cylinder, a main fluid-pressure pipe on each side of the cap-piece, a valved connecting-tube between each main pipe and each chamber, and an escape-valve.

10. In a ramming-head for sand-molding machines, the combination with the head, of a series of cylinders, the head containing a series of chambers in communication with the cylinders, a ram in each cylinder, a source of pressure fluid, means for cutting off the supply of the fluid from the chambers, independently of each other and means for reciprocating the ramming-head.

11. In a sand-molding machine, the combination of fixed uprights or supports, a frame carried by said uprights and adjustable thereon, a ramming-head carrying rammers and adapted to move vertically in said frame, mechanism for reciprocating the ramming-head, a truck beneath the rammers, a rack thereon, and gearing, including a pinion, in engagement with said rack, and operated by said ramming-head-reciprocating mechanism, for moving the truck.

12. In a sand-molding machine, the combination of a vertically-adjustable frame, a ramming-head carrying rammers and vertically movable in said frame, a riddle supported from said vertically-adjustable frame, and mechanism for moving the ramming-head and reciprocating the riddle.

13. In a sand-molding machine, the combination of an adjustable ramming-head carrying rammers for packing the sand in a flask, venting wires or needles adjustable with the ramming-head and having adjustment independent of the head to conform to irregularities in the pattern, and mechanism for reciprocating the needles as the rammers are raised and lowered.

14. In a sand-molding machine, the combination of a rammer-head carrying rammers for packing the sand in a flask, wires or needles supported from and carried by the rammer-head for perforating the packed sand and a fixed bar supported from the machine-frame at a point below the rammers and provided with apertures to receive and guide the wires or needles, substantially as described.

15. In a sand-molding machine, the combination of a ramming-head carrying rammers for packing sand in a flask, and a scraper for removing surplus sand from the flask hinged at one end and obliquely adjustable from the opposite end.

16. In a sand-molding machine, the combination of a ramming-head carrying rammers for packing sand in a flask, and a vertically and obliquely adjustable scraper for removing surplus sand from the flask.

17. In a sand-molding machine, the combination of a flask-carrying frame provided with gudgeons, vertically-movable bars provided with boxes to receive the gudgeons of the frame and suspended from a support above the flask-carrying frame, means for raising the bars to lift the frame, and power-driven means for "turning over" the flask-carrying frame.

18. In a sand-molding machine, the combination of a flask-carrying frame provided with gudgeons, vertically-movable rack-bars provided with boxes to receive said gudgeons, a shaft carrying pinions engaging the rack-bars, driving means, a clutch for clutching and unclutching said means to and from said shaft for actuating the rack-bars, and power-driven means for "turning over" the flask-carrying frame.

19. In a sand-molding machine, the combination of a flask-carrying frame provided with gudgeons, vertically-movable rack-bars provided with boxes to receive said gudgeons, a shaft carrying pinions engaging the rack-bars, driving means adapted to be clutched to and unclutched from said shaft for actuating the rack-bars, a bevel-gear connected to said shaft, a vertically-movable shaft provided at one end with a bevel-gear meshing with a bevel-gear connected to one of the gudgeons of the flask-carrying frame, and a bevel-gear adapted to be clutched to the shaft and meshing with the bevel-gear connected to the bevel-gear on the rack-actuating shaft for "turning over" the flask-carrying frame.

20. In a sand-molding machine, the combination of a flask-carrying frame provided with gudgeons, a frame having boxes to receive said gudgeons, a gear, a pin for locking together said gear and one of the gudgeons, and a shaft carrying a gear meshing with the gudgeon-gear for "turning over" the flask-carrying frame.

21. In a sand-molding machine, the combination of a flask-carrying frame provided with gudgeons, a swinging frame provided with vertically-moving racks formed at their lower ends with boxes for the gudgeons of the flask-carrying frame, means for raising the racks to lift the flask-carrying frame, and means for "turning over" the flask-carrying frame.

22. In a sand-molding machine, the combination of a swinging frame provided with vertically-moving racks formed with boxes at their lower ends, a flask-carrying frame provided with gudgeons journaled in said boxes, a driven shaft provided with pinions meshing with the vertically-movable racks, a pinion connected with one of the gudgeons of the flask-carrying frame, a rotatable shaft provided with a pinion engaging the pinion of the flask-carrying frame, pinions connecting said shaft and the driven shaft, and mechanism for throwing said shafts into and out of action.

23. In a sand-molding machine, the combination of a swinging frame provided with vertically-movable racks and formed with boxes at their lower ends, a flask-carrying frame provided with gudgeons journaled in said boxes, a shaft provided with pinions meshing with the racks, a worm-wheel mounted loosely on said shaft, a worm engaging said worm-wheel, a clutch for locking the worm-wheel to said shaft, a pinion connected to one of the gudgeons of the flask-carrying frame, a shaft carrying a pinion engaging the pinion of the flask-carrying-frame gudgeon, a pinion loosely mounted on said shaft, a clutch for locking said pinion to the shaft, and a pinion actuated from the shaft carrying the worm-wheel and engaging the clutch-pinion on the other shaft.

24. In a sand-molding machine, the combination of a flask-carrying frame provided with flanged supports for a flask, a flanged flask resting on said supports, and sliding clamps engaging the flanged supports and formed with lips to engage the flange of the flask, to clasp the flask to the supports.

In testimony whereof I affix my signature in presence of two witnesses.

WILLIAM J. PATCHELL.

Witnesses:
  HENRY THALE,
  EDWARD C. LOEW.